March 29, 1938.  C. LUCKHAUPT  2,112,245
PROCESS OF HARDENING CELLULOSE MATTER AND RESULTING PRODUCTS
Filed April 23, 1936
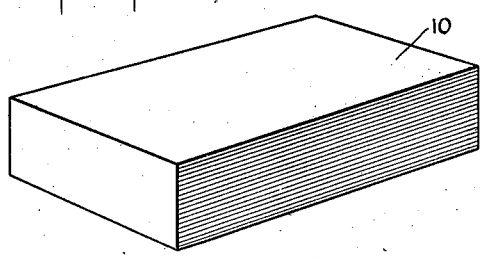
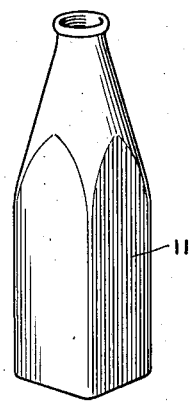
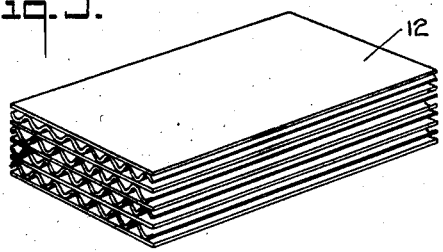
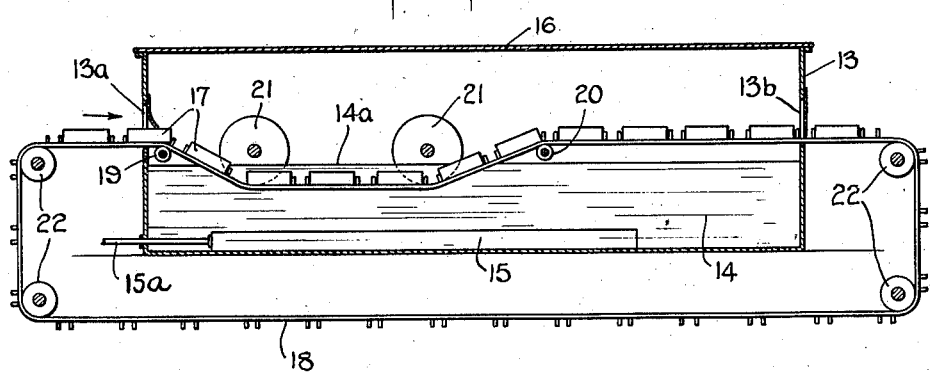
INVENTOR
Christopher Luckhaupt
BY
HIS ATTORNEY Patented Mar. 29, 1938

2,112,245

UNITED STATES PATENT OFFICE 2,112,245

PROCESS OF HARDENING CELLULOSE MATTER AND RESULTING PRODUCTS

Christopher Luckhaupt, Jamaica, N. Y.

Application April 23, 1936, Serial No. 75,929

6 Claims. (Cl. 91—70)

This invention relates to a method of hardening cellulose and kindred matter and products resulting therefrom.

An object this invention is the production of products of cellulose and kindred constituency possessing coefficients of enhanced hardness and enhanced correlated attributes, viz., increased tensile strength, increased flexural strength, increased compressional strength, etc.

An object of the invention is the production of objects of cellulose and kindred constituency possessing attributes of water-, moisture-, oil-, and/or other proofness, and/or fire-proofness, and/or vermin- and other bacteriological-proofness.

An object of the invention is the production of products of cellulose and kindred constituency resistant to weather deterioration, including resistance to the effects of the sun, and like exposure.

Another object of the invention is the production of products of cellulose and kindred constituency embodying one or more of the above stated improved qualities and/or with variant coloring effect.

My invention comprises, in general, the treatment of cellulose and kindred matter by subjecting the same in suitable relation with terpin hydrate, as by immersion in a suitable bath of the stated treatment material, or by subjecting such matter to a spray of such treatment material.

Further features and objects of the invention will be more fully understood from the following detail description and the accompanying drawing, in which Fig. 1 is a perspective view, in diagrammatic form, illustrating cellulose matter treated pursuant to my process, the product represented in this figure being typical of so treated natural cellulose matter such as wood or other vegetable matter, pulp formed therefrom, etc.

Fig. 2 is an elevational view, in diagrammatic form, illustrating a hollow object of cellulose constituency treated pursuant to my process, the indicated bottle being typical of various forms of bottomless as well as bottomed objects, the latter serving as a bottle or other container.

Fig. 3 is a perspective view, in diagrammatic form, illustrating a product formed pursuant to my process, the illustration being typical of fabricated products, such as corrugated board and the like.

Fig. 4 is a diagrammatic view, in elevation, indicating certain essential steps in carrying out the immersion method of my invention.

Referring to the drawing illustrating typical products attained pursuant to my invention, and indicative of other products suitable to the attainment of the purposes of my invention:

In general, my process comprises treating objects of original natural or artificial cellulose constituency with terpin hydrate or equivalent, as by immersion, spraying or other suitable procedure whereby such treatment material penetrates the pores or interstices of such original objects and by impregnation action imparts the characteristics of greatly improved physical attributes and immunity to water, moisture, oils and other chemicals, and other attributes as appears more fully hereinafter.

Preferably, pursuant to my immersion procedure, the treatment material is heated to a temperature of 115° C., and upward, in a suitable tank or other container, the object to be treated being immersed in such bath, and upon withdrawal therefrom, the treated object is passed through an atmosphere at elevated temperature, whereupon the product is substantially complete.

Highly satisfactory results are attained by immersing the object in a bath of terpin hydrate, $C_6H_8(OH)_2(CH_3)(C_3H_7)$—$H_2O$, formed by heating terpin hydrate crystals or powder in a suitable container until the terpin hydrate melts, i. e., is dissolved in its own water of crystalization, the temperature of the container being maintained at 115° C., or upward. Such container is preferably substantially closed relative to the outer atmosphere, suitable provision being made for the charging of the object into such container for immersion into such bath, the object after immersion being continued in an atmosphere of a temperature of at least 115° C., for a relatively short time period, usually but a few minutes.

My invention is applicable also for treating objects of cellulose or kindred constituency, such as wood or other natural vegetable matter, or artificial cellulose containing objects by spraying the stated treatment material upon such object, suitable provision being made for heating and maintaining the treatment material and the spray of the treatment material at proper elevated temperature, and, desirably additionally, the faces of the object subjected to the spray.

It is advantageous, in employment of my immersion procedure and spraying procedure, to provide that the treatment material in excess of that absorbed by the treated object, be returned, i. e., in fluid or powder at elevated temperature to the bath or other reservoir containing the supply of the treatment material.

Illustrations of objects of suitable constituency applicable to treatment pursuant to my process are: wood and other plant growths, inclusive of vegetable matter, objects made of pulps of paper, wood, vegetable and other cellulose or cellulose-containing pulp, such as sheets, board, molded objects of such material such as bottles, boxes and other containers, tubes or other hollow rods, solid rods, cellular structures, artificial silk, cellulose textiles, etc.

By my process, the object treated is enhanced in hardness, that is to say, increased in tensile strength, flexural strength, compression strength, and other physical characteristics imparting strength and rigidity, etc.

Predicated upon products which I have produced pursuant to my process and upon the results of tests thereon, such hardening and other enhanced attributes are effected by the penetration of terpinhydrate into and within the original cellular and/or porous structure of the treated material and impregnation of the treatment material throughout the treated material, dislodgement and expulsion of moisture and other constituents of natural or artificial cellulose matter, which constituents normally subject cellulose matter to rot or other deterioration, attack by vermin, etc.

Pursuant to my process, "green" wood may be cured by impregnation of my stated treatment material, as herein set forth, the curing operation being completed in the course of a brief time duration, which may be even less than one hour.

My process is applicable conjointly with the dual treatment with fortifiers affording the attributes of water-proofness, fire-proofness, vermin resistance and the like. As a fortifier for water-proofness, I cite aluminum subacetate, aluminum stearate, calcium stearate and the like. Such fortifier may be added, as a powder, to the melted terpinhydrate.

Aluminum subacetate, as a fortifier renders the resulting product fire resistant, that is to say, non-self-combustible.

Utilizing as a fortifier, cupric stearate, added to the melted terpinhydrate, the resulting product is water-proofed, and resistant to barnacles, termite and other vermin attack as well as increased in hardness and attendant physical attributes.

Creosote or the like may also be added to the melted terpinhydrate, rendering the resulting product rot- and worm-proof. Zinc acetate or zinc stearate function as fortifiers to impart hardness and rot- and vermin-proofness.

Fortifiers for effecting high electrical insulation may be employed conjointly with my stated treatment material, rendering the resulting product acceptable under the fire underwriters' requirements as commercial electrical insulation. For such purpose, a fortifier such as lead stearate may be added to the melted terpinhydrate.

Magnesium stearate, manganese oleate, and the like may be employed as fortifiers, similarly as above, for impregnating and hardening purposes.

Montan wax, carnauba wax, when employed as fortifiers with terpinhydrate, effect electrical insulating qualities to wood and other natural vegetable matter, wood pulp and other cellulose matter, natural, artificial and fabricated.

If desired, waxes and the like may be added to the melted terpinhydrate, such as carnauba wax, ceresin wax, etc., to impart a permanent source of polish or gloss, and function to control by proportional quantity the degree of pliability.

Triphenyl phosphate may be employed as a fortifier for rendering the product water-proof, and fire-proof as well as of enhanced hardness, etc. Zinc acetate, as a fortifier, enhances fire resistance and zinc stearate as a fortifier enhances water-proofness.

A product of superior qualities as building material is derived from ply-wood and like laminated cellulose constituency, possessing the strength of natural wood, with moisture-, water-, fire-, vermin- and other desired proofness.

Textiles formed of rayon and other synthetic cellulose matter may be similarly treated for resistance against water absorption, resistance against combustion, the texture of the resulting textile product being controlled in pliability by the addition of suitable placticizers.

Cedar oil or like material, particularly useful for preservation of wool garments and the like against moths and other vermin, may be incorporated with my melted treatment material, whereby the resulting product is premanently impregnated with such source of cedar or like atmosphere. Boxes and the like, of paper or other cellulose constituency, thus treated, may serve as cedar chests, "moth bags" and the like.

Color, as desired, may be imparted to the treated article, by adding suitable color, such as analine, vegetable, mineral and other dyes, pigments, etc. to the melted terpinhydrate.

Sheets, board, corrugated board, bags, cups and the like, of present commercial and other approved individual products of paper and other cellulose constituency, when treated pursuant to my invention, are transformed into strong and rigid objects, possessing optionally any of the stated additional attributes. Tubes, rods and the like of original paper or wood pulp or other cellulose constituency are transformed into material suitable for commercial uses comparable in strength, weight supporting qualities, resistance against crushing, etc., to like attributes of natural wood, metal and the like, with the added attributes of moisture- and water-proofness, fire-resistance, oil-repellance, vermin-proofness, electrical, heat and sound insulating, etc., as optionally desired. Such treated articles may usefully serve in sheet or board as pie plates, dishes and table ware, wall board, wall panels, shingle material, roofing covering, floor covering, etc., and in hollow forms as bottles, glasses and the like, flower and other pots, conduits for electrical wiring, waste and other fluid conduits, etc.

So-called regenerated celluloses and the like, the so-termed "Cellophane" being typical, when treated as above set out, retain transparency as well as being enhanced in mechanical strength, and rendered water-, moisture- and other fluid-proof, etc., serving as substitutes for panes of glass, glass bottles and other containers, etc. If desired, a degree of translucency, had by selection of proper color added to the treatment material, may be imparted by my process.

Fig. 1 illustrates at 10 a generally solid article typical of substitute lumber, board, tile, block or other unit for wall, floor, ceiling, etc., of buildings, vehicles such as automobiles, airplanes, toy vehicles, etc., steamboats, lifeboats, canoes, rowboats, and other navigation vessels, etc., treated pursuant to my invention as elsewhere herein more specifically set forth.

Fig. 2 illustrates at 11 an object, specifically shown as a bottle, but typical generally of hollow objects whether provided with a bottom or not, with variant outer and inner configurations, treated pursuant to my invention as elsewhere herein more specifically set forth.

Fig. 3 illustrates at 12 an object specifically of mechanically cellular structure but typical generally of fabricated non-solid constituency, treated pursuant to my invention as elsewhere herein more specifically set forth.

Fig. 4 diagrammatically indicates an approved type of tank 13 for containing a bath 14 of the treatment material, constituted as more specifically set forth elsewhere herein, which bath may be maintained at the desired elevated temperature by means of a heating element shown diagrammatically at 15, advantageously of electrical type, the electrical wiring being indicated at 15a. Such tank is substantially wholly closed to the outer atmosphere, as by a cover, canopy or other form of closure indicated at 16, suitable means of entry as at 13a and of exit as at 13b for the objects to be treated, as for instance by continuous operation upon a series of objects indicated at 17 to be immersed into and conveyed through such bath 14, as by means of an endless chain 18 of conventional or other approved type, suitable mutually spaced breaker rolls being indicated at 19, 20, within such tank 13 to effect the lowered travel of such endless chain 18 to fully immerse such objects 17 below the level 14a of such bath 14; such complete immersion may be positively had by the employment of the supplemental rolls indicated at 21, 21. Breaker rolls are indicated at suitable locations 22 exteriorly of the tank 13 for the desired travel of the endless chain 18 and the propulsion of the same.

Tubes and like pre-shaped objects of paper stock, paper pulp, may be treated pursuant to my invention and transformed into curtain and like supporting rods, waste piping, water and other distribution conduits and the like.

In general, pre-shaped objects of natural cellulose matter in whole or in part fabricated into products of paper, paper pulp, wood pulp, and the like, may be transformed by utilization of my invention into objects possessing controlled enhanced tensile, flexural and compression strength in substitution of metal and like normally rigid materials, or other less rigid materials such as celluloid, plastics, etc.

Characteristic properties of objects treated pursuant to my invention reside in the complete closure of the normal interstices of the surfaces of the original material and complete closure of inner cells and/or voids, by the impregnated terpin hydrate, with or without any stated or other suitable fortifier or fortifiers further, by my process the surfaces of the treated product are rendered wholly smooth. If an external finish is desired, the treated product requires but simple finishing operation, such as a single sanding operation, to fully prepare the object for any surface finish such as by the medium of shellacs, or varnishes, or oil paints of turpentine, linseed oil, benzene, mineral spirits as vehicles, or lacquers such as of nitrocellulose, acetylcellulose and the like, or of other soluble "cottons", phenol derivative and other synthetic resins, casein, paints, etc.

My treatment material may be employed as a priming coat for the stated materials, rendering the treated object water-proof, etc., applicable for objects subject to water immersion, steam and other moisture exposure, etc.

My treatment material possesses also adhesive properties while in tacky status, thus enabling component parts to be formed of wood, paper or wood pulp, or the like, the component parts after being suitably treated, as aforesaid, for the above stated attributes, are readily formed into the desired final product by mere mechanical assembly.

A characteristic of my invention resides in the feature of imparting non-warping and non-shrinking attributes to the pre-shaped product treated pursuant to my process.

A further characteristic resides in the attribute that the treated product preserves permanently the contour inward as well as outward and all dimensions of the original pre-shaped object treated.

Further objects capable of being produced pursuant to my invention are plates for baking, transporting and serving pies, cakes and the like produced from suitably molded i. e. pre-shaped cellulose containing matter.

Further objects of sheet form produced by my invention may be utilized in substitution of felt or the like as sound deadeners, as in application to metal or other wall parts of automobiles, and the like, liners, wall insulation and the like.

Pursuant to my invention, the degree of the respective attributes of hardness and/or water-proofness and/or oil-proofness and/or sound insulation and/or fire-proofness and/or electrical insulation in use as dielectrics is controlled by regulating the temperature of the bath of the treatment material in excess of 115° C., the higher the temperature the greater the degree of imparted stated attributes and the lower the temperature in excess of 115° C. the lesser the degree of imparted stated attributes, and/or by regulating the time period of treatment, the longer the period of treatment the greater the degree of imparted stated attributes, and vice versa, and/or by selection of added fortifiers of selected density, the greater the density of the fortifier or fortifiers, the less the extent of penetration and the less attendant degree of the imparted stated attributes.

By my treatment, balsa wood and like natural cellulose matter normally of non-uniform hardness and/or variant porosity have imparted thereto when treated pursuant to my method uniform hardness and full absence of pores and other voids.

Balsa wood when treated pursuant to my invention is rendered germ-free and germ-proof, as well as water-proofed. Balsa wood and like woods may be treated for complete impregnation or partial impregnation, or mere surface impregnation pursuant to the procedures above set forth. White wood, when treated pursuant to my invention, fulfills the requirements of material for heels for ladies' shoes, etc.; the product after immersion bonds readily with coating material such as varnishes, lacquers, etc. by mere application of the same. Dyes, as above set out, may be incorporated with my treatment material, thus affording coloring coincidently with imparting the improved attributes as above enumerated, the product being fully finished as a result of my stated immersion treatment, per se.

Should any high finish be desired of products treated pursuant to my method, the same is attained by mere sanding and/or buffing or like simple procedure.

Objects comprising cellulose when treated with certain fortifiers with my treatment material are rendered proof against alcohol and/or against ethyl acetate, and/or against butyl acetate, and/or against amyl acetate, and/or methyl or ethyl or butyl cellosolve, and/or other materials of like hydrocarbon constituency. Examples of such type of fortifiers are strontium glycerophosphate with addition of a paraffin wax and the like.

The above enumerated fortifiers attaining water-proofness impart also the attribute of milk-proofness. Strontium glycerophosphate utilized as a fortifier with my treatment material imparts proofness with respect to carbon tetrachloride and also with respect to turpentine and a large number of other hydrocarbons.

Objects treated pursuant to my invention may be treated for surface finishing, as by a simple immersion in appropriate baths, such as an aqueous solution of casein and formaldehyde, preferably dilute, or with an aqueous solution of albumen followed by suitable heat treatment or the like for setting of same and/or for rendering the same insoluble, and kindred treatment.

Cellulose and kindred material treated as above, attain the above recited attributes attended with substantially no tendency of brittleness. Objects treated pursuant to my invention are substantially devoid of tendency to split, are readily clear bored by any usual or other appropriate boring tool, readily sawed, cut or otherwise severed, readily planed, readily pierced by nails or screws, readily shaped by shaping tools, all without splitting, without surface checking and/or other defects imparted to the treated material by the above operations. In operations of sawing, cutting or other severing the severed faces are finished smooth, free from irregular or jagged edges and free from loose fibers or fragments of the severed material; in fact, the severed faces attain a polished surface by the severing operation, per se.

As indicative of the nature of hardness, coupled with increased tensile strength, increased flexural strength, increased compression strength, I cite the following illustrations:

Commercial 20 pound kraft paper under the Mullin test having an average rupture strength of the order of 40 pounds per square inch, when treated pursuant to my invention has imparted thereto a rupture strength of the order of 140 lbs. per square inch and upwards.

Commercial flower pots molded from pulp of newspaper stock having an average wall thickness of the order of a quarter of an inch, when treated pursuant to my invention readily withstand the weight of a person exceeding 200 lbs. without collapse and in fact without fracture or other permanent deformation of the material. The elasticity of the product imparted by my treatment material functions to restore the object to its former configuration upon release of such imposed load.

A characteristic of my process resides in the attainment of improved hardness and attendant improved tensile, flexural and compression strengths imparted to the object treated, wholly without subjecting the treated article to compression treatment, yielding products pursuant to my method superior to present commercial acceptable plastics and the like, and obviating by my process molds, presses, etc., necessary in the production of present commercial plastics.

As herein appears, improved qualities are imparted to porous material when treated with my stated treatment materials, terpin hydrate alone and terpin hydrate with one or more fortifiers selected to impart the desired improved particular qualities.

My invention is also applicable generally to porous structures, such as "Cellotex", artificial wall boards, etc.

Whereas, I have described my invention by reference to specific forms thereof it will be understood that many changes and modifications may be made without departing from the spirit of the invention.

I claim:

1. The method of imparting enhanced hardness to porous cellulosic material, which comprises subjecting the same to terpin hydrate at a temperature at or above the melting point of terpin hydrate.

2. The method of imparting enhanced hardness to porous cellulosic material which comprises subjecting the same to immersion in terpin hydrate at a temperature at or above the melting point of terpin hydrate.

3. The method of imparting enhanced hardness to a preshaped porous cellulosic object which comprises subjecting the same to a spray of terpin hydrate at a temperature at or above the melting point of terpin hydrate.

4. The method of imparting enhanced hardness to porous cellulosic material which comprises subjecting the same to melted terpin hydrate and controlling the degree of hardness by regulating the temperature of the treatment and regulating the time period of treatment.

5. The method of imparting enhanced hardness to a preshaped porous cellulosic object which comprises subjecting the same to immersion in terpin hydrate at a temperature at or above the melting point of terpin hydrate and withdrawing the thus treated cellulosic object from such immersion into an atmosphere of elevated temperature.

6. An object made from porous cellulosic material, said cellulosic material having its original interstices impregnated with solid terpin hydrate.

CHRISTOPHER LUCKHAUPT.